United States Patent [19]

King

[11] 4,341,617
[45] Jul. 27, 1982

[54] LIQUID TREATER HAVING ELECTRICAL CHARGE INJECTION MEANS

[76] Inventor: Arthur S. King, 8021 Cherokee La., Leawood, Kans. 66206

[21] Appl. No.: 229,960

[22] Filed: Jan. 30, 1981

[51] Int. Cl.³ .............................................. B03C 5/02
[52] U.S. Cl. .................................... 204/302; 204/272
[58] Field of Search ............... 204/302, 304, 305, 306, 204/307, 308, 272, 275, 299, 300, 164, 149; 250/531, 542

[56] References Cited

U.S. PATENT DOCUMENTS

| | | | |
|---|---|---|---|
| 672,230 | 4/1901 | Lacomme | 204/149 |
| 672,231 | 4/1901 | Lacomme | 204/149 |
| 2,050,301 | 8/1936 | Fisher | 204/299 R X |

*Primary Examiner*—Delbert E. Gantz
*Assistant Examiner*—William Leader
*Attorney, Agent, or Firm*—Schmidt, Johnson, Hovey & Williams

[57] ABSTRACT

The treater is provided with oppositely charged electrodes which cause liquid passing through the treater to be exposed to an electric field. At least one of the electrodes includes a distribution of sharp projections which protrude outwardly therefrom toward the opposite electrode. Such projections are all provided with outermost, conical tips that serve to inject charge carriers into the liquid at an accelerated rate if the treater is electrolytic in nature and serve to focus or concentrate the electric field if the treater is electrostatic in nature as a result of the two electrodes of the treater being electrically insulated from one another across the liquid being treated. A number of treater variations are provided, including flat plate-type electrodes and cylindrical versions of the unit.

4 Claims, 11 Drawing Figures

U.S. Patent  Jul. 27, 1982  Sheet 1 of 2  4,341,617
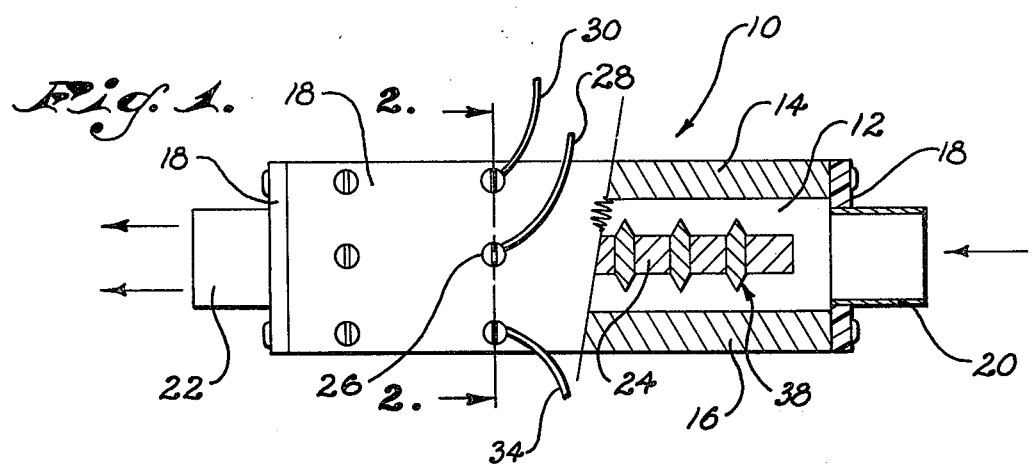
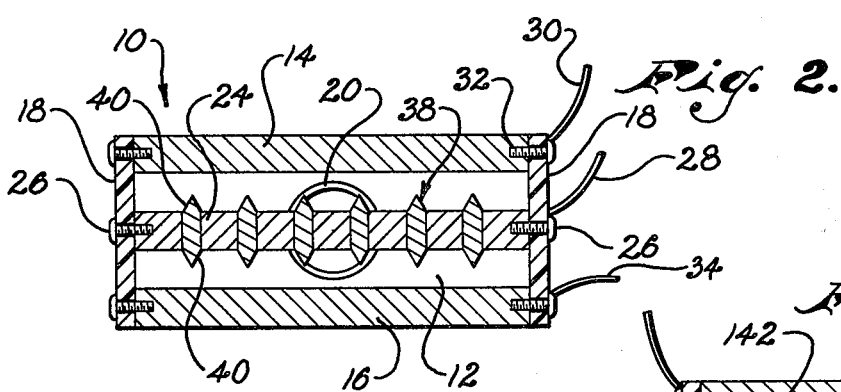
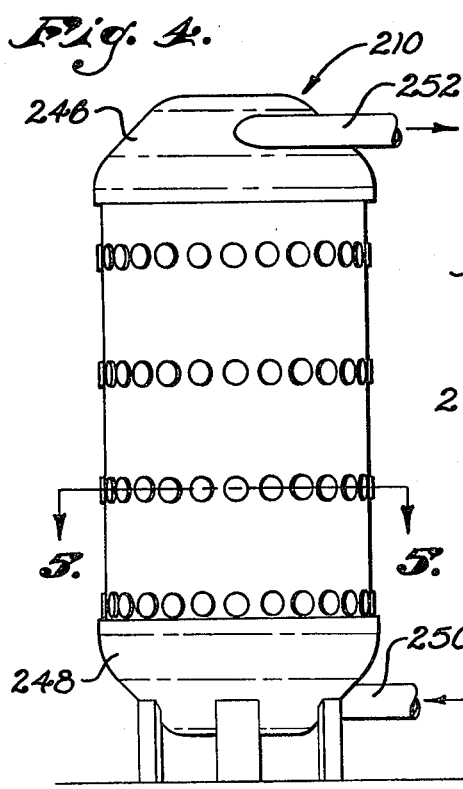
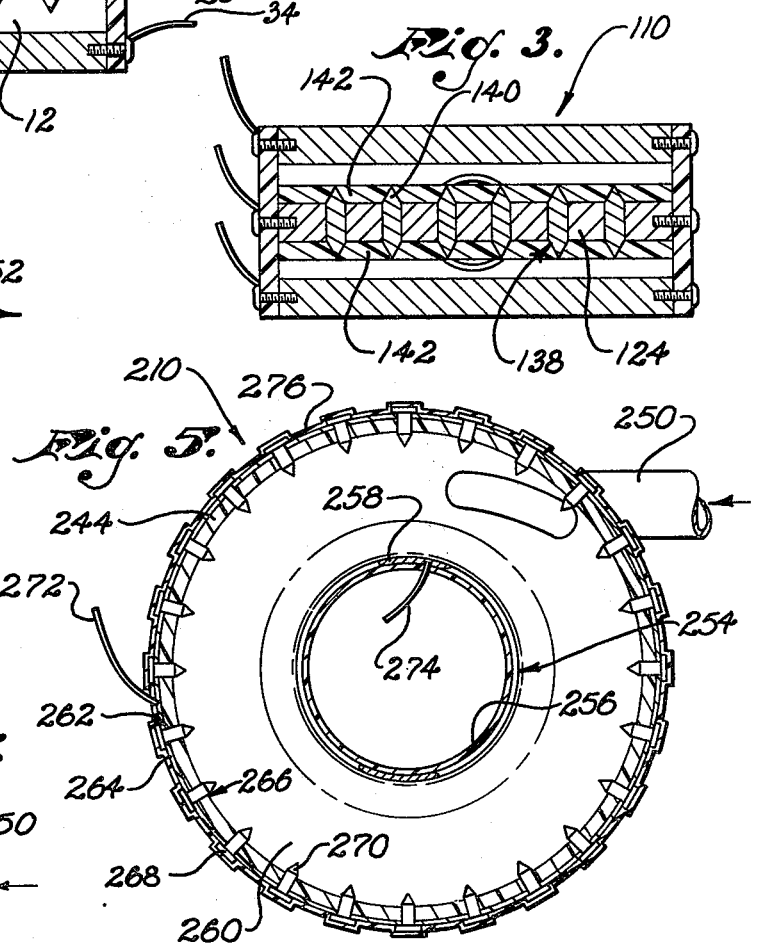

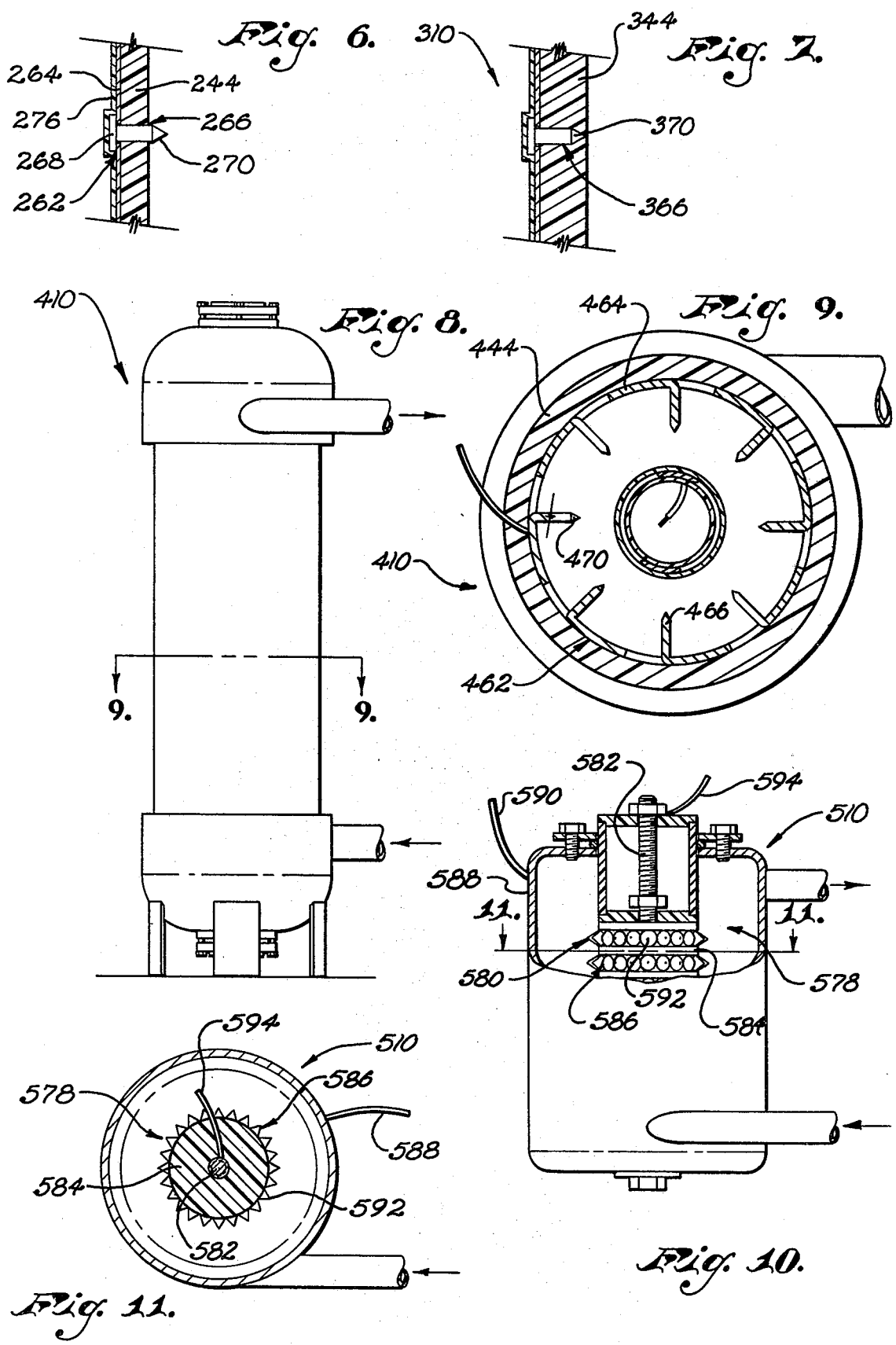

LIQUID TREATER HAVING ELECTRICAL CHARGE INJECTION MEANS

TECHNICAL FIELD

This invention relates generally to the field of treating waste liquids by electrical means in order to induce impurity particles carried by the liquid to flocculate and subsequently precipitate out.

BACKGROUND ART

The present invention is an improvement upon certain of my prior inventions for encouraging the flocculation of impurity particles carried by waste liquids for the ultimate objective of clarifying the liquids so that they may be discharged harmlessly into streams or processed by municipal sewage treatment systems without deleterious effects. One such treater is shown, described and claimed, for example, in my U.S. Pat. No. 3,972,800.

Generally speaking, although the precise mechanism involved in treaters of this type is not fully understood, it is believed that by subjecting the liquid to an electric field, especially one in connection with an electrolytic action in which electrical current flow is involved, the impurity particles are so affected that they become more attractive to each other and agglomerate or flocculate more willingly than would otherwise be the case. With their mass thus increased, the particles more readily settle out in settling tanks and the like situated downstream from the electrical treaters.

SUMMARY OF THE PRESENT INVENTION

Although it is generally well known that injection of charged carriers into a liquid insulator may increase its conductivity by many orders of magnitude, this phenomenon has not heretofore been utilized to great advantage in the treatment of waste liquid to encourage flocculation of its impurity particles. Accordingly, one important object of the present invention is to provide a waste liquid treater which includes as one of its electric field generating electrodes, a multiplicity of sharply conically pointed projections which have the effect of injecting charge carriers into the liquid in the event of an electrolytic treater and concentrating or focusing the electric field in the event of an electrostatic treater where one of the electrodes is electrically insulated from the liquid itself. In one form of the invention the electrodes are in the nature of flat plates, and the projections take the form of spikes which are imbedded in one of the electrodes in electrical contact therewith. The conical tips of the spikes protrude outwardly from the expansive surface of the flat electrode such that the injection of charges occurs only at the tips themselves in the case of the electrolytic treater or, in the alternative, the concentration of the electric field occurs at the tips in the event of an electrostatic treater. Other forms include generally cylindrical treaters in which one electrode is arranged concentrically within the other. In one of such cylindrical treaters, the outer electrode essentially consists of the electrified projections protruding inwardly through the dielectric wall of the housing comprising the exterior of the treater; in another form, the outer electrode substantially comprises a cylindrical liner wherein the projections are punched and cut, inturned portions of the liner itself; in a still further form, the projections are on the inner electrode of the concentric pair and are generally in the form of flat plates with sawtooth projections about the peripheries thereof, the plates being arranged in a stack separated by alternately disposed insulators.

BRIEF DESCRIPTION OF THE DRAWINGS

FIG. 1 is an elevational view of a treater constructed in accordance with the principles of the present invention, the exterior of the treater being partially broken away to reveal details of construction;

FIG. 2 is a transverse cross-sectional view thereof taken substantially along line 2—2 of FIG. 1;

FIG. 3 is a cross-sectional view similar to FIG. 2 but showing the tips of the projections covered with insulators to render the treater electrostatic in nature as opposed to the electrolytic arrangement of FIGS. 1 and 2;

FIG. 4 is an elevational view of a second basic form of a treater embodying the principles of the present invention, said second form being generally cylindrical in configuration as opposed to the flat, platelike configuration of the treaters in FIGS. 1-3;

FIG. 5 is an enlarged, transverse cross-sectional view thereof taken substantially along line 5—5 of FIG. 4;

FIG. 6 is an enlarged, fragmentary detail view of the wall of the treater showing the way in which the same is electrolytic in nature as a result of the exposed tip of each electrode projection;

FIG. 7 is a view similar to FIG. 6 but showing the way in which that style of treater may be rendered electrostatic in nature by covering the tip of the electrode projection with an insulator;

FIG. 8 is an elevational view of another form of cylindrical treater embodying the principles of the present invention;

FIG. 9 is an enlarged, transverse cross-sectional view thereof taken substantially along line 9—9 of FIG. 8;

FIG. 10 is a still further form of cylindrical treater embodying the principles of the present invention; and FIG. 11 is a transverse cross-sectional view thereof taken substantially along line 11—11 of FIG. 10.

DETAILED DESCRIPTION

The treater 10 of FIGS. 1 and 2 is generally box-like in overall configurations having an interior treating chamber 12 defined in part by a pair of flat, electrically conductive plates 14 and 16 maintained in spaced apart relationship by end wall spacers 18 (only three being shown) of suitable dielectric material. End walls 18 thus cooperate with the plates 14 and 16 in defining the chamber 12 to which access is permitted by the inlet 20 for liquid to be treated. Egress from the chamber 12 is provided by the outlet 22.

Centrally disposed within the chamber 12 is a flat plate 24 of electrically conductive material spanning the end walls 18 and suitably supported in place by fastening means such as the screws 26. An electrical lead 28 is electrically connected to the plate 24 via the metal screw 26, the lead 28 being connected at its opposite end to one side of a source of electrical potential. A second lead 30 is electrically connected at one end to the plate 14 via a metal attaching screw 32 between the end wall 18 and the plate 14, the opposite end of the lead 30 being connected to that side of the source of the electrical potential which is opposite from the side to which the lead 28 is connected. If desired, a third lead 34 may be electrically connected at one end to the other plate 16 via a metal attaching screw 36 between the end wall 18 and the plate 16, the opposite end of the lead 34 being connected to the same side of the source of electrical potential as the lead 30.

As a result of this arrangement, the plates 14, 16 and 24 are electrified so as to produce an electric field within the chamber 12. In the case of the plates 14 and 16, they serve as both physical boundaries for the chamber 12 and as electrodes for cooperating with the inner electrode plate 24 in establishing the electric field.

The inner electrode plate 24 is provided with a multiplicity of projections 38 throughout its expanse. In the illustrated embodiment, each of the projections 38 extends entirely through the plate 24 to protrude outwardly from opposite sides thereof toward the respective electrode plate 14 or 16. Each of the projections 38 is in the nature of a spike of electrically conductive material that is embedded within the plate 24 except for an exposed, outermost, conical tip 40 at each end thereof.

The treater 110 shown in FIG. 3 is similar in all respects to the treater 10 of FIGS. 1 and 2, except for the fact that the inner electrode plate 124 is provided with a platelike insulator 142 on its two opposite sides covering the otherwise exposed tips 140 of the projections 138. Thus, the treater 110 is rendered electrostatic in nature.

The treater 210 of FIGS. 4, 5 and 6, is an electrolytic treater of cylindrical overall configuration in contrast to the box-like, plate configuration of the treaters 10 and 110. A cylindrical housing 244 of dielectric material is closed at its two opposite ends by an upper cap 246 and a lower cap 248. An inlet tube 250 tangentially intersects the lower end cap 248 to communicate the interior of the housing 244 with a supply of liquid to be treated, while an outlet tube 252 tangentially intersects the upper end cap 246 to discharge treated material from the interior of the housing 244. An inner electrode 254 is arranged concentrically in the housing 244 in spaced relationship therewith, such inner electrode 254 preferably being formed by an upright tube 256 of dielectric material enveloped by helical windings 258 of a suitable conductor. The inner electrode 254 and the housing 244 thereby cooperate to define, in conjunction with the end caps 246 and 248, an interior chamber 260.

An outer electrode 262 is defined by a sheath 264 of electrically conductive foil or the like about the exterior of the housing 244, and by a multiplicity of projections 266 in the nature of metal spikes having broad, flat heads 268 at their outer ends and conically pointed tips 270 at their inner ends. The spikes protrude entirely through the sheath 264 and housing 244 to expose their tips 270 to liquid flow within the chamber 260. A lead 272 connected to the sheaths 264 at one end and to one side of a source of electrical potential at the other end serves to electrify the sheath 264 and thereby also the projections 266 via the heads 268. A second lead 274 is connected to the windings 258 of inner electrode 254 at one end and at its opposite end is connected to the side of the source of electrical potential that is opposite the side to which the lead 272 is connected. Preferably, the projections 266 are arranged in several sets of circumferentially extending series, the sets being desirably spaced apart longitudinally of the elongated treating chamber 260.

If desired, the heads 268 of the projections 266, shown exposed in FIG. 4, may be covered with a suitable dielectric wrapping 276 as shown in FIGS. 5 and 6. As also shown in FIGS. 5 and 6, the tips 270 of the projections 266 are exposed fully to the liquid within the chamber 260 such that the treater 210 is in the nature of an electrolytic treater.

On the other hand, the treater 310 as shown only fragmentarily in FIG. 7 is identical in construction to the treater 210 except that the tips 370 of the projections 366 are fully covered by the dielectric housing wall 344. Thus, projections 366 are not directly physically exposed to the liquid processed by the treater 310, and the latter becomes electrostatic in nature.

FIGS. 8 and 9 illustrate another cylindrical treater 410 which is substantially similar to the treater 210, except in the specific construction of the outer electrode 462. In this regard, in lieu of the sheath 264 of the treater 210, the treater 410 employs a cylindrical liner 464 situated interiorly of the housing 444 in abutting relationship therewith. The projections 466 are presented by cut-and-punched, inturned portions of the liner 464, such portions having conical, pointed terminations or tips 470. If desired, the treater 410 may be converted into an electrostatic treater by covering the exposed tips 470 with a suitable dielectric material.

FIGS. 10 and 11 illustrate a still further embodiment of the present invention. In this regard, the treater 510 therein shown is cylindrical in general overall configuration and is similar in many respects to the treaters 210, 310 and 410. In the treater 510, it is the inner electrode 578 that is provided with the projections instead of the outer electrode thereof. In this regard, the inner electrode 578 includes a stack of generally platelike discs 580 arranged on a common screw or mounting shaft 582 running the full length of the treater 510. A corresponding series of insulators 584 is likewise arranged on the mounting shaft 582 with an insulator 584 situated between each adjacent pair of discs 580. Each of the discs 580 is provided with its own circumferential series of projections 586 arranged peripherally about the exterior thereof and projecting generally radially toward the outer housing 588 which may be electrically conducive in nature and provided with a lead 590 so as to electrify the same. Each of the projections 586 has an outwardly pointed, conical tip 592 as in all of the other treaters herein illustrated, the discs 580 being electrified by a lead 594 leading to one side of a source of electrical potential of opposite polarity to the side of the source of electrical potential to which the lead 590 is connected.

In other general constructional and operating respects, the treater 510 is similar to the cylindrical treaters 210, 310 and 410, and further details of the treater 510 will thereby be readily understood by those skilled in the art without further explanation herein. If desired, the treater 510, while being shown as electrolytic in nature, may be converted to electrostatic in nature by providing an insulative covering for the inner electrode 578 such that the tips 592 of the projections 586 are not directly physically exposed to the liquid passing through the treater 510.

The operation of the treaters hereinabove described should be apparent from the foregoing description. In each of the electrolytic treaters, it will be understood that an electrical current flow is established between the inner and outer electrodes as a result of electrons entering the liquid from one electrode (the cathode) and attaching themselves immediately to a molecule or atom to form a negative ion or anion. At the other electrode (anode), electrons are removed from atoms or molecules, thus forming positive ions or cations. The impurity particles present in the liquid also take part in the conduction process and behave as any other charged particle or ion.

As a result of the sharply pointed, conical nature of the tips of the one electrode of each treater, charged carriers are injected into the liquid flowing through the treater at a substantially greater order of magnitude than is the case where no projections are utilized and the substantially flat surfaces alone of the electrodes are depended upon to cause electrons to enter and be removed from the liquid. Consequently, the tendency for the impurity particles to flocculate and subsequently precipitate out of the liquid is likewise increased significantly.

Where the treaters are of the electrostatic type because the tips of the projections are insulated from the oppositely charged electrode, an improved flocculating action is obtained beyond that available in electrostatic treaters not employing sharpened projections as part of their electrode system, but the overall effect has not been determined to be up to the order of magnitude available in the electrolytic equipment.

I claim:

1. An electrical treater for use in causing the flocculation of impurity particles in a liquid comprising:
    means for defining a treating chamber;
    means for introducing liquid to be treated into said chamber and for directing liquid out of said chamber after treatment; and
    a pair of oppositely electrically charged electrodes associated with said chamber in disposition for exposing the liquid in said chamber to an electric field established between said electrodes,
    at least one of said electrodes including a multiplicity of projections each directed toward the other electrode and terminating in an outermost, generally conical tip,
    said electrodes being electrically insulated from one another to prevent electrical current flow therebetween,
    said one electrode being provided with an electrical insulator covering said tips of the projections to prevent physical contact of the tips with liquid in said chamber.

2. An electrical treater for use in causing the flocculation of impurity particles in a liquid comprising:
    means for defining a treating chamber;
    means for introducing liquid to be treated into said chamber and for directing liquid out of said chamber after treatment; and
    a pair of oppositely electrically charged electrodes associated with said chamber in disposition for exposing the liquid in said chamber to an electric field established between said electrodes,
    at least one of said electrodes including a multiplicity of projections each directed toward the other electrode and terminating in an outermost, generally conical tip,
    said chamber defining means including a pair of flat, electrically conductive, mutually spaced plates and dielectric spacer means between said plates, said plates being connected across a source of electrical potential, presenting said electrodes,
    said projections including a plurality of spikes imbedded in one of said plates,
    said tips being located at the outer ends of said spikes,
    said spikes being provided with an electrical insulator covering said tips.

3. An electrical treater for use in causing the flocculation of impurity particles in a liquid comprising:
    means for defining a treating chamber;
    means for introducing liquid to be treated into said chamber and for directing liquid out of said chamber after treatment; and
    a pair of oppositely electrically charged electrodes associated with said chamber in disposition for exposing the liquid in said chamber to an electric field established between said electrodes,
    at least one of said electrodes including a multiplicity of projections each directed toward the other electrode and terminating in an outermost, generally conical tip,
    said chamber defining means including a cylindrical housing, said one electrode being associated with said housing and the other electrode being disposed concentrically within said housing in spaced relationship thereto,
    said tips of the projections being electrically insulated from liquid within the chamber.

4. An electrical treater as claimed in claim 3, wherein said housing is constructed of dielectric material, said tips of the projections being imbedded within and covered by said housing.

* * * * *